United States Patent
Neitemeier et al.

(10) Patent No.: US 11,596,102 B2
(45) Date of Patent: Mar. 7, 2023

(54) AGRICULTURAL HARVESTING MACHINE

(71) Applicant: CLAAS Selbstfahrende Erntemaschinen GmbH, Harsewinkel (DE)

(72) Inventors: Dennis Neitemeier, Lippetal (DE); Joachim Baumgarten, Beelen (DE); Andreas Wilken, Bissendorf (DE); Bastian Bormann, Guetersloh (DE); Sebastian Spiekermann, Ostbevern (DE); Daniel Irmer, Herzebrock-Clarholz (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 369 days.

(21) Appl. No.: 16/886,883

(22) Filed: May 29, 2020

(65) Prior Publication Data

US 2021/0015040 A1 Jan. 21, 2021

(30) Foreign Application Priority Data

Jul. 15, 2019 (DE) ...................... 10 2019 119 126.2

(51) Int. Cl.
*A01D 41/127* (2006.01)
*A01D 34/00* (2006.01)
(Continued)

(52) U.S. Cl.
CPC ....... *A01D 41/1271* (2013.01); *A01D 34/008* (2013.01); *A01D 41/141* (2013.01); *A01D 61/008* (2013.01); *A01D 75/287* (2013.01)

(58) Field of Classification Search
CPC ................ A01D 34/008; A01D 41/127; A01D 41/1271; A01D 41/14; A01D 41/141; A01D 41/16; A01D 57/04
See application file for complete search history.

(56) References Cited

U.S. PATENT DOCUMENTS 6,389,785 B1 * 5/2002 Diekhans ............. A01B 69/008
172/4.5
8,161,718 B2 4/2012 Bussmann et al.
(Continued)

FOREIGN PATENT DOCUMENTS

DE 102005050751 A1 8/2007
EP 2060164 A1 5/2009
(Continued)

OTHER PUBLICATIONS

EPO machine translation of EP 2681984 A1 (original EP document published Jan. 8, 2014) (Year: 2014).*
(Continued)

*Primary Examiner* — David A Testardi
(74) *Attorney, Agent, or Firm* — Collard & Roe, P.C.

(57) ABSTRACT

An agricultural harvesting machine has a cutting apparatus formed as a header for cutting and picking up crop of a crop stand, an inclined conveyor downstream of the cutting apparatus and in which a temporal layer height flow is adjusted, and a driver assistance system for controlling the cutting apparatus. The driver assistance system has a computing device and a sensor arrangement with a crop sensor system for generating crop parameters of the crop stand and a layer height sensor for generating the temporal layer height flow. The computing device simultaneously generates the cutting apparatus parameters of the cutting table length, horizontal reel position and vertical reel position so as to be adapted to one another and conveys them to the cutting apparatus to implement a harvesting process strategy in ongoing harvesting operation.

10 Claims, 2 Drawing Sheets

(51) Int. Cl.
*A01D 41/14* (2006.01)
*A01D 61/00* (2006.01)
*A01D 75/28* (2006.01)

(56) References Cited

U.S. PATENT DOCUMENTS

| | | | |
|---|---|---|---|
| 9,807,926 B2 | 11/2017 | Wilken et al. | |
| 2003/0184747 A1* | 10/2003 | Diekhans | A01D 41/127 342/123 |
| 2004/0006958 A1* | 1/2004 | Thiemann | A01D 41/141 56/10.2 R |
| 2009/0107094 A1* | 4/2009 | Bich | A01D 41/141 56/10.2 E |
| 2014/0295922 A1* | 10/2014 | Buermann | A01D 41/06 460/149 |
| 2015/0216123 A1* | 8/2015 | Digman | A01D 41/141 56/14.9 |
| 2016/0106038 A1* | 4/2016 | Boyd | A01D 34/006 56/10.2 J |
| 2016/0286720 A1* | 10/2016 | Heitmann | G05B 17/02 |
| 2016/0286721 A1* | 10/2016 | Heitmann | A01D 41/1272 |
| 2016/0286722 A1* | 10/2016 | Heitmann | A01F 12/58 |
| 2017/0049045 A1* | 2/2017 | Wilken | A01D 41/06 |
| 2019/0021226 A1* | 1/2019 | Dima | A01D 34/006 |
| 2021/0015040 A1* | 1/2021 | Neitemeier | A01D 34/008 |
| 2021/0235622 A1* | 8/2021 | Baumgarten | A01D 41/1271 |
| 2022/0217910 A1* | 7/2022 | McKinney | A01D 57/04 |

FOREIGN PATENT DOCUMENTS

| | | | |
|---|---|---|---|
| EP | 2681984 A1 * | 1/2014 | ........... A01D 41/141 |
| EP | 2681984 A1 | 1/2014 | |
| EP | 2702854 A1 | 3/2014 | |
| EP | 3132665 A1 * | 2/2017 | ........... A01D 41/127 |
| EP | 3132711 A1 | 2/2017 | |
| EP | 3300580 A1 * | 4/2018 | ........... A01D 41/141 |

OTHER PUBLICATIONS

EPO machine translation of EP 3300580 A1 (original EP document published Apr. 4, 2018) (Year: 2018).*
European Search Report dated Dec. 16, 2020 issued in European Application No. 20 16 1945 (with English translation of the relevant parts).

* cited by examiner

AGRICULTURAL HARVESTING MACHINE

CROSS-REFERENCE TO RELATED APPLICATIONS

This application claims priority under 35 USC 119 of German Application No. DE 10 2019 119 126.2, filed on Jul. 15, 2019, the disclosure of which is herein incorporated by reference.

BACKGROUND OF THE INVENTION

The invention is directed to an agricultural harvesting machine with a cutting apparatus formed as a header.

The agricultural harvesting machine in question is any harvesting machine outfitted with a cutting apparatus which is formed as a header for cutting and picking up crop. This may be a combine harvester, forage harvester, baling press, or the like. The present discussion has primarily to do with the harvesting machine formed as a combine harvester.

The optimal adjustment of the cutting apparatus of an agricultural harvesting machine is particularly important in that it affects not only the cutting apparatus itself but all of the subsequent process stages. Manual adjustment of the cutting apparatus parameters associated with the cutting apparatus is nearly impossible in view of a multitude of boundary constraints, some of which are mutually conflicting.

For this purpose, the known agricultural harvesting machine (EP 3 132 711 A1) on which the invention is based is outfitted with a cutting apparatus automation which generates the relevant cutting apparatus parameters according to selected harvesting process strategies on the basis of characteristic maps. This generic concept of a cutting apparatus automation forms a comprehensive foundation for an automated or partially automated optimization of cutting apparatus parameters. The input parameters of the known cutting apparatus automation are, along with user input, the sensor signals of a sensor arrangement which has a crop sensor system for determining crop parameters of the crop stand and a layer height sensor for determining the curve of the layer height over time.

A particular challenge in the design of the known cutting apparatus automation consists in reducing throughput fluctuations as far as possible, i.e., fluctuations in the temporal layer height flow. The reason for this is that such throughput fluctuations lead to losses in subsequent process stages.

Another challenge in the design of known cutting apparatus automations consists in preventing to the greatest extent possible those grain losses occurring directly at the cutting apparatus.

SUMMARY OF THE INVENTION

The invention is based on the problem of configuring and further developing the known agricultural harvesting machine in such a way that the generation of the cutting apparatus parameters is optimized with respect to low grain losses.

This problem is remedied in an agricultural harvesting machine which is formed as a header for cutting and picking up crop of a crop stand, with an inclined conveyor which is downstream of the cutting apparatus and in which a temporal layer height flow is adjusted, and with a driver assistance system for controlling at least the cutting apparatus. The driver assistance system comprises a computing device and a sensor arrangement with a crop sensor system for determining crop parameters of the crop stand and a layer height sensor for determining the temporal layer height flow. Based on an evaluation of sensor signals of the sensor arrangement, the computing device simultaneously generates at least the cutting apparatus parameters of the cutting table length, horizontal reel position and vertical reel position so as to be adapted to one another and conveys them to the cutting apparatus in order to implement a harvesting process strategy in ongoing harvesting operation. The signal evaluation comprises a vibration analysis of the temporal layer height flow at least for producing the cutting table length.

The suggested solution is based first of all on the fundamental insight that an adjustment of cutting table length, horizontal reel position and vertical reel position so as to be adapted to one another is a necessary precondition for preventing grain losses occurring at the cutting apparatus itself. This has to do in particular with adapting the horizontal reel position to the cutting table length in such a way that the reel never protrudes beyond the cutting table horizontally. Protruding in this way would lead to grain falling in front of the cutting apparatus table and not reaching the inclined conveyor and, accordingly, to losses of which the operator of the vehicle would not be aware.

According to the suggestion, it has also been recognized that there are vibration effects at the cutting apparatus which propagate over the transported flow of crop. These vibration effects are due to the fact that periodic jam effects occur at the cutting apparatus depending on the adjustment of the cutting apparatus parameters, particularly on the input side of the header auger, leading to resulting vibrations in the temporal layer height flow. In view of the fact that the cutting and gathering of crop by means of the cutting apparatus is a complex process with numerous potential vibration exciters, the vibration of the temporal layer height flow can extend over different vibration frequencies or whole vibration frequency ranges.

Finally, it was recognized that the vibrations in the temporal layer height flow can be decisively influenced by changing the length of the cutting table. Correspondingly, a vibration analysis of the temporal layer height flow is suggested at least for generating the cutting table length.

The simultaneous adjustment of cutting table length, horizontal reel position and vertical reel position such that they are adapted to one another and the generation of the cutting table length, which can be optimized in technical respects pertaining to vibration, results in a novel potential for reducing grain losses not only in the cutting apparatus itself but also in the downstream process stages.

In particular, it is suggested that, based on an evaluation of sensor signals of the sensor arrangement, the computing device simultaneously generates at least the cutting apparatus parameters of the cutting table length, horizontal reel position and vertical reel position so as to be adapted to one another and conveys them to the cutting apparatus in order to implement a harvesting process strategy in ongoing harvesting operation, and that the signal evaluation comprises a vibration analysis of the temporal layer height flow at least for producing the cutting table length.

In one configuration, the harvesting process strategy is defined by the minimization of predetermined vibration components in the temporal layer height flow. This is implemented in a particularly simple manner in that the suggested vibration analysis includes generating a vibration coefficient of a vibration component in the temporal layer height flow for a predetermined vibration frequency or a predetermined vibration frequency range. The vibration coefficient indicates that portion of the temporal layer height flow that accounts for the predetermined vibration frequency or the predetermined vibration frequency range. Fundamentally, the vibration coefficient corresponds to the concept of the Fourier coefficient insofar as the vibration analysis is a Fourier analysis.

The suggested vibration analysis of the temporal layer height flow is preferably a Fourier analysis so that the vibration coefficient basically corresponds to a Fourier coefficient. However, any other mathematical method of vibration analysis may be applied in principle.

Tests have shown that the vibration frequencies in question lie within the range of a few hertz.

The further preferred configurations relate to the generation of the cutting apparatus parameters, particularly the cutting table length, on the basis of characteristic curves, which makes it possible to realize the minimization of an above-mentioned vibration component with comparatively little computational effort.

The configurations, which are likewise preferred, relate to details for the adjustment of the reel position which, as suggested, is adapted to the cutting table length so that grain losses occurring directly at the cutting apparatus can be effectively reduced.

BRIEF DESCRIPTION OF THE DRAWINGS

The invention will be described in more detail in the following referring to drawings in which only one embodiment example is depicted. In the drawings.

DETAILED DESCRIPTION OF THE EMBODIMENTS

Figure 1:
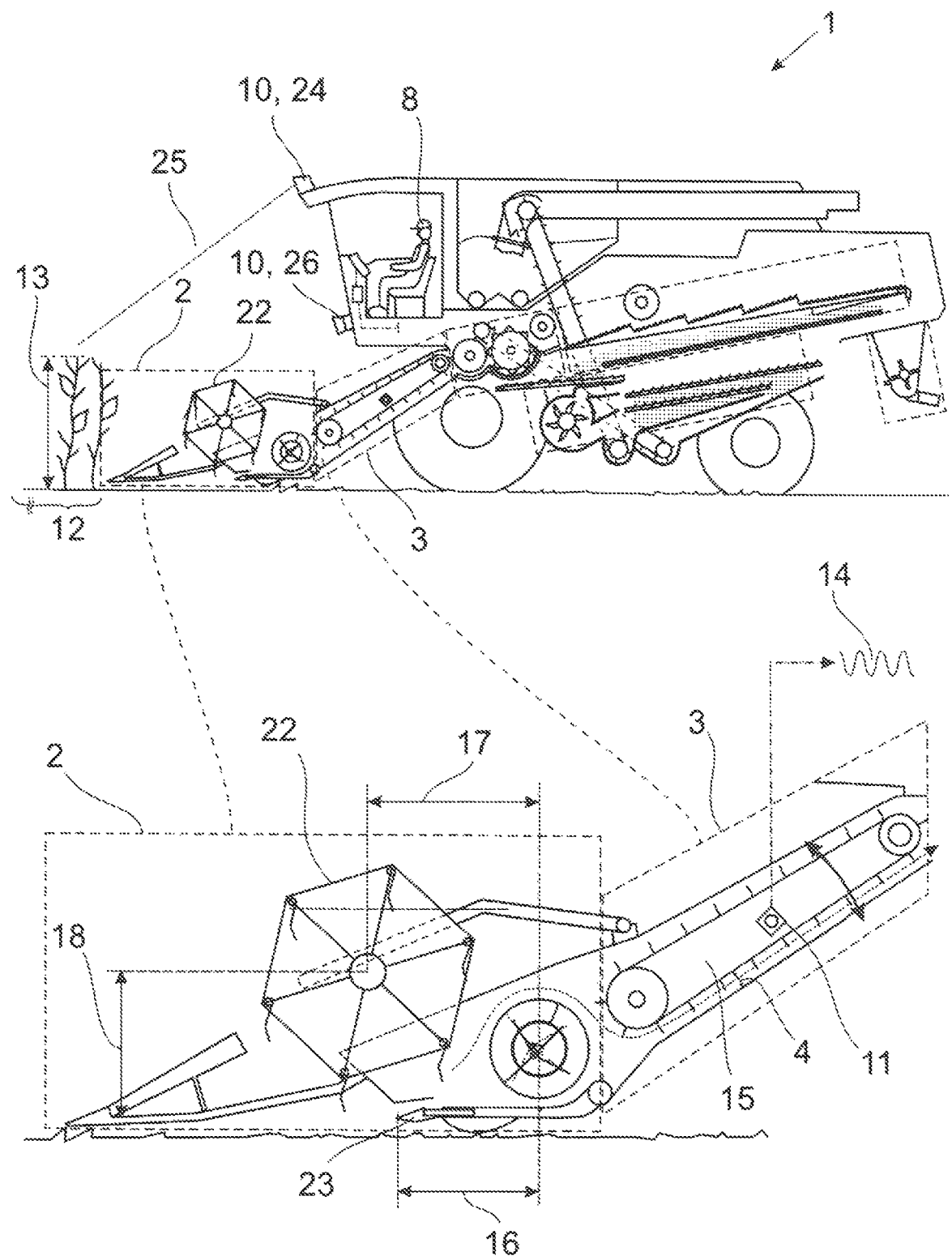
FIG. 1 shows a suggested agricultural harvesting machine in a side view.

A suggested agricultural harvesting machine 1 which is formed in the present instance and preferably as a combine harvester has a cutting apparatus 2 which is formed as a header for cutting and picking up crop. The cutting apparatus 2 is preferably exchangeable with another cutting apparatus 2 so that the harvesting machine 1 can be adapted for harvesting different types of crop. By "crop" is meant the totality of material gathered from the crop stand via the cutting apparatus 2. As will be appreciated from FIG. 1, a crop stand is cut by the cutting apparatus 2 and the crop obtained in this way is fed to an inclined conveyer 3. The crop passes through the inclined conveyer 3 with a layer height 4. The instantaneous value of the layer height 4 corresponds to the instantaneous value of the product throughput. Accordingly, there ensues in the inclined conveyer 3 a temporal layer height flow 14 representing any change in product throughput.

The suggested harvesting machine 1 further has a driver assistance system 5 for controlling the cutting apparatus 2. This driver assistance system 5 comprises a storage 6 for storing data—i.e., a storage within the meaning of information technology—and a computing device 7 for processing the data stored in the storage 6. The driver assistance system 5 is basically adapted to assist a driver 8 of the harvesting machine 1 in the operation of the harvesting machine 1. The driver assistance system 5 with the storage 6 and the computing device 7 is shown schematically in FIG. 2.

The driver assistance system 5 has, in addition to the computing device 7, a sensor arrangement 9. The driver assistance system 5 uses the sensor signals of the sensor arrangement 9 to control the cutting apparatus 2. The sensor arrangement 9 can have a plurality of sensors or sensor systems. It is suggested that the sensor arrangement 9 has at least one crop sensor system 10 and a layer height sensor 11.

The crop sensor system 10 serves to determine crop parameters particularly in an area 12 in front of the harvesting machine 1. The crop parameters can be the crop height 13, for example, as will be shown later.

The layer height sensor 11 serves to determine the temporal layer height flow 14 relating to the above-mentioned layer height 4 in the inclined conveyer 3. In the embodiment shown, the inclined conveyer 3 has a deflectable layer height roller 15. The deflection of the layer height roller 15 is a measurement for the instantaneous layer height 4 in the inclined conveyer 3. Accordingly, the temporal layer height flow 14 corresponds to the sensor signal of the layer height sensor 11 which monitors the deflection of the layer height roller 15.

The cutting apparatus 2 together with the driver assistance system 5 forms a cutting apparatus automation. This is preferably realized in that a plurality of selectable harvesting process strategies 6a are stored in the storage 6 and, in order to implement the selected harvesting process strategy 6a or harvesting process strategies 6a, the computing device 7 is adapted to autonomously generate at least one cutting apparatus parameter for the cutting apparatus 2 and to convey the at least one cutting apparatus parameter to the cutting apparatus 2. With respect to the basic functioning of such a cutting apparatus automation, reference is made to European Patent Application EP 3 132 711 A1 of the present applicant, the contents of which are incorporated to this extent in the present application.

It is key that, in order to implement the relevant harvesting process strategy 6a in ongoing harvesting operation based on an evaluation of the sensor signals of the sensor arrangement 9, the computing device 7 simultaneously generates at least the cutting apparatus parameters of cutting table length 16, horizontal reel position 17 and vertical reel position 18 such that they are adapted to one another and conveys these cutting apparatus parameters to the cutting apparatus 2. It was mentioned above that particularly low grain losses can already be achieved in the cutting apparatus 2 and in the downstream process stages with this step. The adaptation of the reel position to the cutting table length 16 will be described more fully in the following using the example of the horizontal reel position 17.

It is further key that the signal evaluation comprises a vibration analysis of the temporal layer height flow 14 at least for generating the cutting table length 16. It was also mentioned above that the vibration components contained in the temporal layer height flow 14 can be adjusted in a decisive manner through the cutting table length 16.

Taken together, the two steps mentioned above enable extremely low grain losses and a homogenization of product throughput. The latter aspect in turn results in a reduction in grain losses in the process steps downstream of the cutting apparatus 2.

It should be noted that it is possible to use sensors for the sensor-based determination of the temporal layer height flow 14 other than the layer height roller 15 mentioned above. For example, a contactless determination of layer height 4 is also conceivable.

The harvesting process strategy 6a is preferably a matter of minimizing vibration components in the temporal layer height flow 14 for a predetermined vibration frequency or a predetermined vibration frequency range. In view of the above-mentioned significance of the cutting table length 16, it is suggested in this regard that, in order to implement this harvesting process strategy 6a, the computing device 7 generates at least the cutting table length 16 and conveys the latter to the cutting apparatus 2.

The determination of the cutting table length 16 such that the relevant vibration component in the temporal layer height flow 14 is minimized can be implemented in a particularly simple manner computationally. To this end, the vibration analysis comprises first the generation of a vibration coefficient 19 of a vibration component in the temporal layer height flow 14 for a predetermined tuning frequency or a predetermined vibration frequency range. The vibration coefficient 19 represents to a certain extent the strength of the relevant vibration component in the temporal layer height flow 14 and, in principle, can be a Fourier coefficient as was mentioned above. In this case, it is further preferable that the harvesting process strategy 6a comprises a minimization of the vibration coefficient 19, and the computing device 7 in turn produces at least the cutting table length 16 and conveys the latter to the cutting apparatus 2 for implementing the harvesting process strategy 6a. Accordingly, it is merely necessary to select a cutting table length 16 corresponding to a minimum of the vibration coefficient 19.

The above-mentioned predetermined vibration frequency or predetermined vibration frequency range preferably lies between 0.5 Hz and 10 Hz, particularly between 1.0 Hz and 5 Hz.

In particular, the minimization of the vibration coefficient 19 can preferably be realized in that at least one characteristic diagram 6b is stored in the computing device 7 for mapping the functional relationship between the vibration coefficient 19, the cutting table length 16 and a product throughput value 20. In so doing, at least the cutting table length 16 is generated based on the characteristic diagram 6b. A characteristic diagram 6b of this kind is shown in the detail view in FIG. 2. The product throughput value 20 is a time-averaged product throughput which is further preferably derived from the sensor signals of the layer height sensor 11. A variety of different averaging methods can be used for this purpose.

Figure 2:
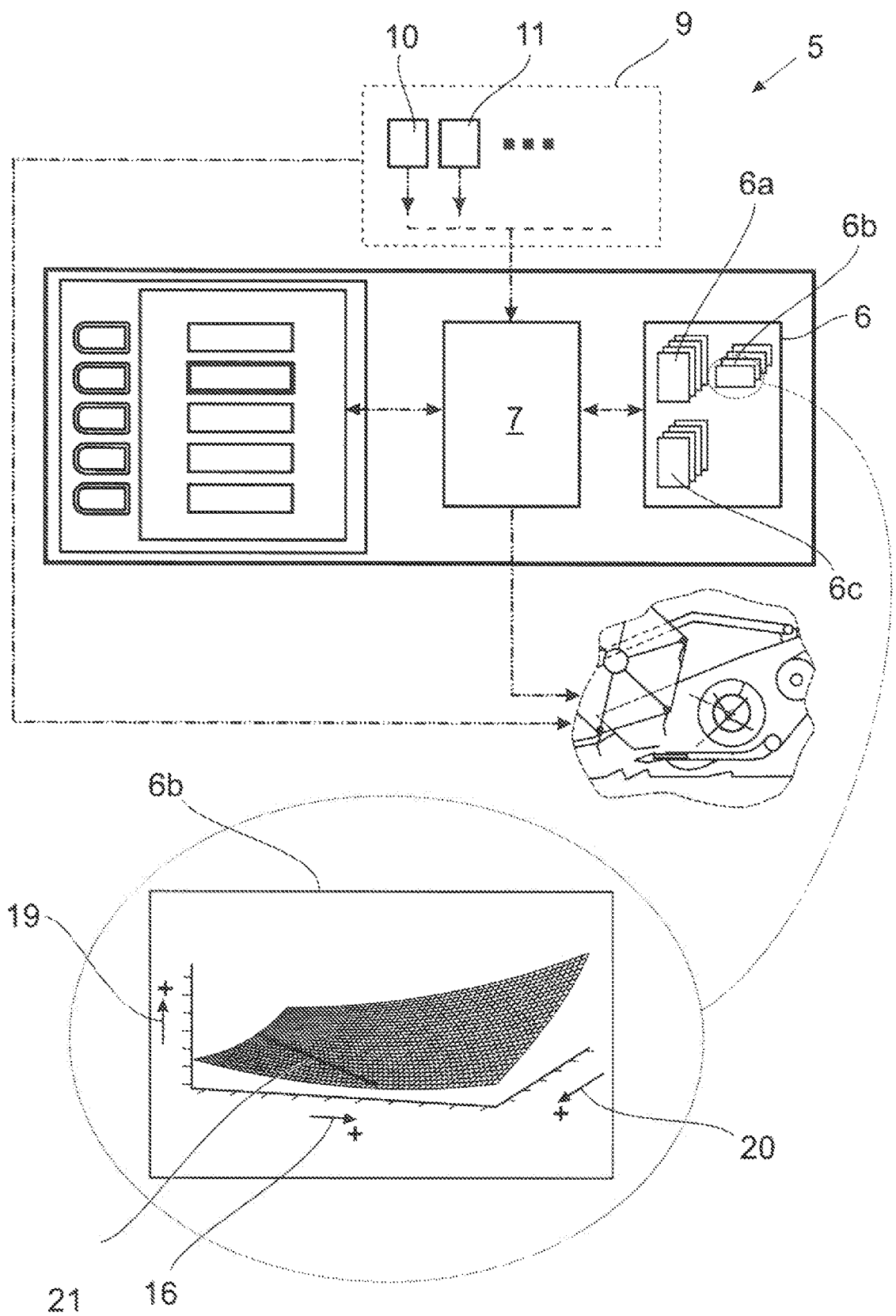
FIG. 2 shows a schematic depiction of a driver assistance system of a suggested harvesting machine according to FIG. 1.

The detail view in FIG. 2 shows that, according to the characteristic diagram 6b, the vibration coefficient 19 runs through a minimum when passing through the cutting table length adjustment range for at least a subrange of product throughput values 20. Correspondingly, the above-mentioned harvesting process strategy 6a of minimizing the vibration coefficient 19 can be implemented without time-consuming calculation. Accordingly, an optimal line 21 which provides optimal working points with respect to minimizing the vibration coefficient 19 is plotted in this detail view.

The particular advantage of using a characteristic diagram control is that no closed-loop control with a sluggish controlling behavior need be used to implement the harvesting process strategy 6a; rather, the computing device 7 works in the manner of an open-loop control for implementing the harvesting process strategy 6a and extracts the respective value for the optimal cutting table length 16 without iteration and directly from the characteristic diagram 6b. In order to ensure that the characteristic diagram 6b takes into account the actual functional relationship between the relevant values, it is preferably provided that the computing device 7 compares the characteristic diagram 6b to the sensor signals of the sensor arrangement 9 while the harvesting operation is ongoing. The initial state of the characteristic diagram 6b preferably forms an initial characteristic diagram 6c stored in the computing device 7. With respect to the basic use of characteristic diagrams in the present context, reference is again made to European Patent Application EP 3 132 711 A1, the contents of which are incorporated in the present application.

It has already been mentioned that the reel position is generated so as to be adapted to the cutting table length 16. Referring to the horizontal reel position 17, this means that the horizontal reel position 17 results in a predetermined, in this instance and preferably linear, relationship from the cutting table length 16. Accordingly, the reel 22 should preferably be disposed perpendicularly over the cutter bar 23 of the cutting apparatus 2 subject to an offset value that may possibly be provided. In this way, grains can be prevented from being swept out of the crop stand before the cut by means of the reel 22.

Various strategies can be used for generating the vertical reel position 18.

In the present instance and preferably, the crop sensor system 10 has a crop stand height sensor 24 for measuring the crop stand height 13 in the area in front of the harvesting machine 1. The computing device 7 generates a crop stand height map for the area 12 in front of the harvesting machine 1 from the sensor signals of the crop stand height sensor 24 and generates the vertical reel position 18 based on the crop stand height map. In the simplest case, it is provided that a linear relationship to the measured crop stand height 13 is utilized for generating the vertical reel position.

A wide variety of sensors can be used for the crop stand height sensor 24. In the depicted preferred embodiment example, the crop stand height sensor 24 is a distance sensor, particularly a laser-based distance sensor. In a particularly preferred configuration, a laser scanner is used for the crop stand height sensor 14, which laser sensor impinges with a scan plane 25 at an angle on the crop stand in the area 12 in front of the harvesting machine 1. Further sensors of the sensor arrangement 9 can be used in addition to the above-mentioned crop stand height sensor 24. In particular, it can be advantageous that the crop sensor system 10 has at least one camera sensor 26, and the computing device 7 expands the height map preferably based on the sensor signals of the camera sensor. This can be, for example, to check how the lodged grain in the in-front area 12 is oriented so that optimizing steps can be taken by means of a corresponding adjustment of the cutting apparatus parameters.

It should be noted that the crop stand height 13 has been shown in the drawing as length with reference to the field soil. However, the crop stand height 13 can also be a relative quantity, for example, such that the crop stand height is defined as a change of height of the crop stand along the working direction of the harvesting machine 1. In principle, the crop stand height 13 can be indicated in any unit, for example, also in machine coordinates, provided it represents the crop stand height 13 in the above meaning.

It should also be noted that the determination of the crop stand height 13 need not be carried out in only one scan plane 25, but can be carried out in a plurality of scan planes which impinge on the crop stand in the area 12 in front of the harvesting machine 1 preferably at different angles.

Lastly, it should be noted that the solution proposed herein relates only to a subarea of the control of the harvesting machine 1, particularly of the cutting apparatus 2. In particular, it should be taken into account that, aside from the above-mentioned cutting apparatus parameters, other cutting apparatus parameters exist which are also to be adjusted in an optimal manner such as knife working height, cut angle, speed of the header auger, speed of the reels, cut frequency, or the like. To this extent, it is provided that the solution suggested herein is combined with further solutions for adjusting the rest of the cutting apparatus parameters.

REFERENCE NUMERALS 1 harvesting machine
2 cutting apparatus
3 inclined conveyor
4 layer height
5 driver assistance system
6 storage
7 computing device
8 driver
9 sensor arrangement
10 crop sensor system
11 layer height sensor
12 in-front area
13 crop stand height
14 layer height flow
15 layer height roller
16 cutting table length
17 horizontal reel position
18 vertical reel position
19 vibration coefficient
20 product throughput value
21 optimal line
22 reel
23 cutter bar
24 crop stand height sensor
25 scan plane
26 camera sensor

What is claimed is:

1. An agricultural harvesting machine comprising:
a cutting apparatus formed as a header for cutting and picking up crop of a crop stand, the cutting apparatus having a reel with a horizontal reel position and a vertical reel position, and a cutting table having a cutting table length,
an inclined conveyor arranged downstream of the cutting apparatus, and
a driver assistance system configured for controlling at least the cutting apparatus, the driver assistance system comprising a computing device and a sensor arrangement with a crop sensor system configured for determining crop parameters of the crop stand and a layer height sensor arranged at the conveyor for determining a temporal layer height flow defined as a change in a height of product throughput as product moves along the conveyor,
wherein the computing device is configured to evaluate sensor signals of the sensor arrangement as a signal evaluation and simultaneously generate cutting apparatus parameters of the cutting table length, horizontal reel position and vertical reel position to adjust the cutting apparatus parameters in order to implement a harvesting process strategy in an ongoing harvesting operation, the harvesting process strategy being directed to minimization of vibration components in the temporal layer height flow, and wherein the signal evaluation comprises a vibration analysis of the temporal layer height flow in the form of a Fourier analysis to determine the cutting table length that minimizes a vibration component of the temporal layer height flow.

2. The agricultural harvesting machine according to claim 1, wherein the vibration analysis includes a determination of a vibration coefficient of a vibration component in the temporal layer height flow that represents that portion of the temporal layer height flow that accounts for a predetermined vibration frequency or a predetermined vibration frequency range.

3. The agricultural harvesting machine according to claim 2, wherein the predetermined vibration frequency or predetermined vibration frequency range lies between 0.5 Hz and 10 Hz.

4. The agricultural harvesting machine according to claim 2, wherein the computing device is configured to store at least one characteristic diagram for mapping a functional relationship between the vibration coefficient, the cutting table length and a product throughput value, wherein at least the cutting table length is generated based on the characteristic diagram, and wherein the product throughput value is a time-averaged product throughput.

5. The agricultural harvesting machine according to claim 2, wherein, according to the characteristic diagram, the vibration coefficient has a minimum value along a cutting table length adjustment range for at least a subrange of product throughput values.

6. The agricultural harvesting machine according to claim 4, wherein the computing device is configured to compare the characteristic diagram to the sensor signals of the sensor arrangement while the harvesting operation is ongoing.

7. The agricultural harvesting machine according to claim 1, wherein the computing device is configured to generate the horizontal reel position so as to be adapted to the cutting table length in such a way that the horizontal reel position results in a predetermined linear relationship to the cutting table length.

8. The agricultural harvesting machine according to claim 1, wherein the crop sensor system has a crop stand height sensor configured for measuring the crop stand height in an area in front of the harvesting machine, and in wherein the computing device is configured to generate a crop stand height map for the area in front of the harvesting machine from the sensor signals of the crop stand height sensor and generate the vertical reel position based on the crop stand height map.

9. The agricultural harvesting machine according to claim 8, wherein the crop stand height sensor is a distance sensor.

10. The agricultural harvesting machine according to claim 8, wherein the crop sensor system has at least one camera sensor, and wherein the computing device is configured to expand the crop stand height map based on sensor signals of the at least one camera sensor.

* * * * *